(12) United States Patent
Diamantstein et al.

(10) Patent No.: US 7,109,460 B2
(45) Date of Patent: Sep. 19, 2006

(54) SYSTEM, METHOD AND EQUIPMENT FOR READING INFORMATION ON A TARGET

(75) Inventors: Menachem Diamantstein, Tel Aviv (IL); Yona Newman, Tel Aviv (IL)

(73) Assignee: Motorola, Inc., Schaumburg, IL (US)

( * ) Notice: Subject to any disclaimer, the term of this patent is extended or adjusted under 35 U.S.C. 154(b) by 295 days.

(21) Appl. No.: 10/737,365

(22) Filed: Dec. 16, 2003

(65) Prior Publication Data

US 2004/0129903 A1   Jul. 8, 2004

(30) Foreign Application Priority Data

Dec. 23, 2002   (GB) ................................. 0229754.7

(51) Int. Cl.
*G06K 7/10* (2006.01)
(52) U.S. Cl. ............................. 250/203.1; 235/462.44; 235/462.46; 235/462.42
(58) Field of Classification Search ............. 250/203.1, 250/203.2, 221, 222.1; 235/462.44, 426.46, 235/462.41, 462.42; 382/103; 348/169
See application file for complete search history.

(56) References Cited

U.S. PATENT DOCUMENTS

| | | | | |
|---|---|---|---|---|
| 5,023,709 A | * | 6/1991 | Kita et al. .................. | 348/172 |
| 5,610,387 A | * | 3/1997 | Bard et al. ............. | 235/462.44 |
| 5,793,032 A | * | 8/1998 | Bard et al. ............. | 235/472.02 |
| 6,060,722 A | | 5/2000 | Havens et al. .............. | 250/566 |
| 6,079,862 A | * | 6/2000 | Kawashima et al. ........ | 382/103 |
| 6,155,490 A | * | 12/2000 | Ackley .................. | 235/472.01 |

FOREIGN PATENT DOCUMENTS

EP   1 204 067 A1   5/2002
WO   WO 97/33435 A1   9/1997

* cited by examiner

*Primary Examiner*—Thanh X. Luu
*Assistant Examiner*—Stephen Yam
(74) *Attorney, Agent, or Firm*—Valerie M. Davis

(57) ABSTRACT

A system for illuminating and reading information on a target (12) includes an illuminating device (14) for illuminating the target, separate from the illuminating device a user wearable reader device (11) for capturing an optical image of the target when illuminated by the illuminating device, detector means (30, 35) for detecting the location of the reader device and adjustment means (36, 22) for adjusting the illumination provided by the illumination device in response to a signal provided by the detector means so that a region (33) on the target illuminated by the illuminating means is readable by the reader device. A method of use of the system and an illumination unit for use in the system are also described.

23 Claims, 2 Drawing Sheets

SYSTEM, METHOD AND EQUIPMENT FOR READING INFORMATION ON A TARGET

REFERENCE TO RELATED APPLICATIONS

This application claims priority to Great Britain application Serial No. 0229754.7, filed Dec. 23, 2002.

FIELD OF THE INVENTION

The present invention relates to a system, method and equipment for illuminating and reading information on a target. In particular, it relates to illuminating and reading information in a bar code on a target.

BACKGROUND OF THE INVENTION

Use of optically readable legends or labels such as bar codes on products to record and track the products is widely practised in industry and commerce. It is becoming common for bar code scanner devices which are used to read bar codes, such devices being herein referred to as 'imagers', to be worn on the hand of a user to provide a more ergonomically satisfactory and natural operation for the user. Also with the development of low power, short-range radio data transmission standards such as that known in the industry as Bluetooth™, it is not necessary to have a wired connection from the imager to the equipment processing and using the barcode or image data.

The use of CMOS imager chips in imagers is also becoming more popular because of their lower power consumption (as compared, for example to laser bar-code imagers), allowing a much smaller power source to be used. For example, the Motorola MCM20014 VGA resolution Image-MOS™ sensor can capture an image in $\frac{1}{30}$th second whilst consuming 70 mA at 3.3V whereas a conventional laser scan engine imager will take $\frac{1}{20}$th second and require 150 mA at 5V. An imager chip requires, however, an additional light source to illuminate the target area, e.g. the area on a product where a barcode is provided, if the ambient background light is not sufficient, whereas a laser scanner imager is its own light source. The additional light source is normally provided by a number of LEDs (Light Emitting Diodes or forward biased semiconductor p-n junction diodes) incorporated in a unit which also provides the reader function. The power consumption of the additional light source is considerable and causes the overall imager power consumption to be raised typically to 120 mA at 5V. This is nearly the same as that for the laser scanner imager.

In some proposed scanning and LED illuminating imager devices, an attempt has been made to increase the amount of ambient light on the target by employing light collection and guidance, for example as described in U.S. Pat. No. 6,042,012 but such optical collection systems add considerably to the size and weight of the imager and so are not suitable for use in wearable scanner applications.

Other proposed imagers use a targeting light spot or frame to ensure that the illuminating light source is aligned on the target before scanning so reducing the total illumination time and therefore the energy consumption, as for example described in U.S. Pat. No. 6,340,114. However, again the necessary optical system unfortunately adds considerably to the size of the imager.

In summary, prior art imagers also incorporating an illuminating device are bulky and relatively heavy and are not particularly suitable for hand carried operation.

SUMMARY OF THE PRESENT INVENTION

According to the present invention in a first aspect there is provided a system for illuminating and reading information on a target including an illuminating device for illuminating the target, separate from the illuminating device a user wearable reader device for capturing an optical image of the target when illuminated by the illuminating device, detector means for detecting the location of the reader device and adjustment means for adjusting the illumination provided by the illumination device in response to a signal provided by the detector means so that a region on the target illuminated by the illuminating means is readable by the reader device.

The target may carry a bar code which is to be read by the reader device.

The reader device may comprise an optical bar code reader which converts the bar code into an electronic data signal. The system may also include a radio transmitter associated with the reader device which is operable to transmit the electronic data signal produced by the reader device to a remote radio receiver.

The reader device may be carried on the wrist, hand, finger or thumb of a user. For example, it may include a bracelet or strap to be attached to the user's wrist, or a partly or fully closed ring to be worn on a user's finger or thumb.

The illuminating device may comprise a unit which is wearable by the user on a different part of the user's body, e.g. on the user's chest or waist. The unit incorporating the illuminating device may incorporate a radio transceiver to receive radio signals from a transmitter associated with the reader device and to forward radio signals to a remote receiver, e.g. associated with a control centre where information about products is recorded and processed.

The detector means may comprise a reflector on the reader means and means for irradiating a region including the reader means with a search beam of radiation to be reflected by the reflector when incident thereon. The search beam may comprise an infra-red beam. The detector means may also comprise a sensor to detect radiation reflected by the reflector. One or both of the means for irradiating and the sensor may conveniently be carried by a unit incorporating the illuminating means as referred to earlier.

Alternatively, the detector means may include means for determining the location of the reader device by radio signals sent between a transmitter carried on the reader and a separate receiver. The receiver may be carried on a unit comprising the illuminating device.

The illuminating means may comprise a light source, preferably comprising one or more solid state light cells, e.g. LEDs or electroluminescent cells. The light from the light source may be directed in the form of a beam by an adjustable (orientable) beam director, e.g. a movable mirror, lens, prism or the like. Where a mirror, the adjustable beam director may comprise a mirror which may be orientated electro-mechanically, e.g. by a MEMS (micro electro-mechanical system). Such mirrors are known per se. Where the detector means comprises means for irradiating a region including the reader device with a search beam, the same beam director as used in the means for illuminating may be used to direct the search beam. The search beam may be on whilst the illuminating beam is off and vice versa, although they may be on at the same time if they are in different frequency bands, e.g. the search beam in the infra-red and the illuminating beam in the visible region of the electromagnetic spectrum.

According to the present invention in a second aspect there is provided a method of illuminating and reading information on a target which includes illuminating the target by an illuminating device, capturing an optical image of the target when illuminated by the illuminating device by a reader device separate from the illuminating device, detecting by detector means the location of the reader device, and adjusting the illumination provided by the illumination device in response to a signal provided by the detector means so that a region on the target illuminated by the illuminating means is readable by the reader device.

By the invention, the functions of the illuminating means and the reader device are separated. In contrast to the prior art, the user does not have to adjust the illuminating device to ensure that the region of the target which is illuminated is within the field of view of the reader device. This adjustment is beneficially undertaken automatically by signals from the detection moans controlling and adjustment of the illuminating means. Consequently, the reader device can be suitably small and lightweight and therefore ergonomically more satisfactory than low power prior art bar code readers for use in a single unit in association with an illuminating means.

According to the present invention in a third aspect there is provided a unit for illuminating information on a target to be read by a reader device by the method of the second aspect, including an illumination device for illuminating the target, detector means for detecting the location of the reader device and adjustment means for adjusting the illumination provided by the illumination device in response to a signal provided by the detector means so that a region on the target illuminated by the illuminating means is readable by the reader device.

Embodiments of the present invention will now be described by way of example with reference to the accompanying drawings, in which:

BRIEF DESCRIPTION OF THE
ACCOMPANYING DRAWINGS

DESCRIPTION OF EMBODIMENTS OF THE
INVENTION

Figure 1:
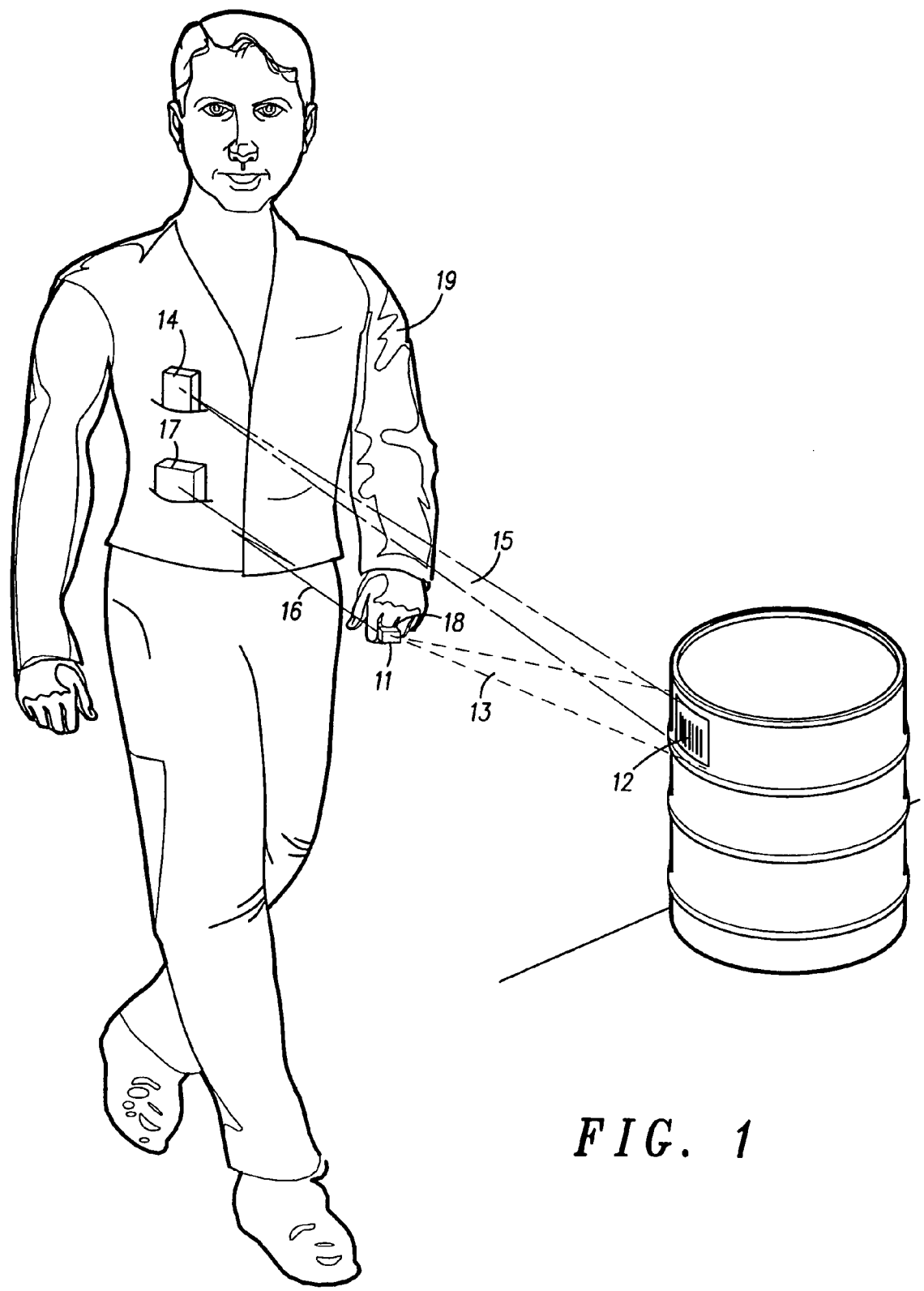
FIG. 1 is a schematic diagram showing a target bar code illuminating and reading system embodying the invention.

As shown in FIG. 1, a system for illuminating and reading information on a target is shown. The target, indicated by reference numeral 12 may for example be a bar code label on a product to be identified and recorded for inventory purposes. The target 12 is illuminated by a beam 15 produced by a target illumination unit 14. An imager 11 points at the target 12 and captures an image of the target 12 in its field of view 13. The imager 11 has a ring 18 attached thereto which is worn by a user on a finger of the user. The imager 11 produces an electronic signal corresponding to the detected optical image and information carried on the target 12. The imager 11 also includes a Bluetooth radio transmitter. The electronic signal is transmitted thereby by a radio communication 16 to a radio transceiver unit 17 carried on the body of the user, indicated by reference numeral 19. The transceiver unit 17 sends and receives information by radio signals to and from a remote central control (not shown) in which information relating to identified products (e.g. as denoted by target 12 and other targets) is stored and processed.

Figure 2:
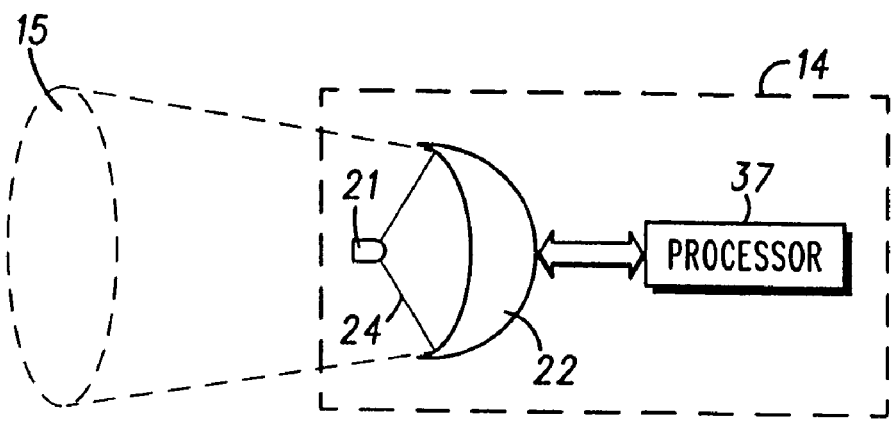
FIG. 2 is a schematic diagram of a target illuminating unit for use in the system shown in FIG. 1.

FIG. 2 shows one form of the unit 14 for producing and positioning the beam 15 for use in the system shown in FIG. 1. A light source 21 produces a beam of light 24 which is incident onto a concave mirror 22 which is part of a MEMS (Micro Electrical Mechanical System) which is capable of electro-mechanically steering the beam 15 which is produced as a reflected beam by the mirror 22 from the beam 24. Unit 14 further includes a processor 37.

Figure 3:
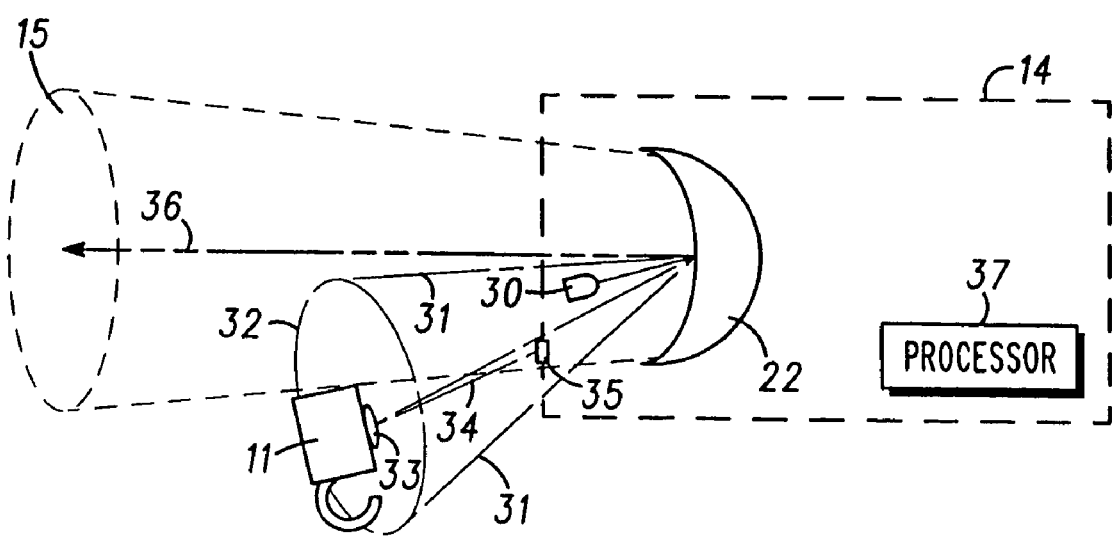
FIG. 3 is a diagram illustrating a system and procedure for imager location for use in the system shown in FIG. 1.

FIG. 3 shows one form of imager location system for use in the illumination and reader system shown in FIG. 1. The unit 14 shown in FIG. 2 is again used. A focused and modulated beam of infra-red radiation is produced by a source 30 and is directed at the minor 22. The beam is modulated to avoid the detection system being saturated or confused by infra-red energy from external sources such as the sun or room lighting The beam is reflected by the mirror 22 to produce an infra-red beam 31. The beam 31 is scanned over a search area 32 by the mirror 22 until it is reflected back by a small target reflector 33 carried on the imager 11. A reflected beam 34 is thereby produced which is detected by a sensor 35 carried by the unit 14. The orientation of the beam 31 at the instant the reflected beam 34 is detected by the sensor 35 is recorded by a processor 37 included in the unit 14. This orientation captures the instant position of the reflector 33 and imager 11 within the area scanned by the infra-red beam 31. A suitable incremental change in orientation of a required principal direction or axis 36 of the beam 15 is made by adjustment of the orientation of the mirror 22 causing the beam 15 to illuminate the target 12 (FIG. 1)in an area within the field of view 13 of the imager 11.

The beam 31 is modulated to avoid the detection system comprising the sensor 35 being saturated or confused by infra-red energy from external sources such as the sun or room lighting. For example, the beam 31 may be modulated with a sine wave at a fixed frequency. A narrow band filter at this frequency may be applied by the sensor 35.

In an alternative form of the location system instead of that shown in FIG. 3, a wireless signal may be sent from the imager 11 serving as a first radio terminal to a first receiver unit within the unit 14 and also to a second receiver unit. The relative position of the imager 11 may thereby be determined in a known manner, e.g. by taking time difference of arrival and received signal strength measurements from a signal sent from the imager 11 to the two receiver units. In this procedure, the equipment has to be calibrated when first worn by the user since the relative positions of the two receiver units will vary from user to user. This may be carried out by the user manually aligning the beam 15 to provide a reference point which is recorded by a processor within the unit 14. Desirably, the imager 11 and the first and second receiver units are separated by distances which are as great as possible.

For example, if Bluetooth™ short range radio communication is used in the alternative form of location system, a signal frame in the 2.4 GHz band containing timing information is established. At the speed of radio-waves, 300 million metres/sec, the time difference between the same signal received at two locations which are 1 metre apart, will be 0.33 microsecs—an easily detected and measurable difference. Since the two signals received have the same clock, we can synchronize to that clock and then measure phase differences between the two signals to obtain a very precise estimate of time of difference of arrival between the signals. This is turn can be translated into a distance measurement and then standard triangulation methods can be used to calculate the position of the imager 11 (transmitting unit) relative to the receiving units.

We claim:

1. A system for illuminating and reading information on a target, the system comprising:
    an illuminating device for illuminating the target;
    separate from the illuminating device a user wearable reader device for capturing an optical image of the target when illuminated by the illuminating device;
    detector means for detecting the location of the reader device; and
    adjustment means included in the illuminating device for automatically adjusting the illumination provided by the illuminating device in response to a signal provided by the detector means to the adjustment means so that a region on the target illuminated by the illuminating device is readable by the reader device.

2. A system according to claim 1, wherein the reader device is operable to read a bar code on the target.

3. A system according to claim 2, wherein the reader device is operable to convert the read bar code into an electronic data signal.

4. A system according to claim 3, wherein the system also includes a radio transmitter associated with the reader device which is operable to transmit the electronic data signal produced by the reader device to a remote radio receiver.

5. A system according to claim 1, wherein the reader device is adapted to be carred on the wrist, hand, finger or thumb of a user.

6. A system according to claim 5 and wherein the reader device includes a bracelet or strap to be attached to a user's wrist, or a partly or fully closed ring to be worn on a user's finger or thumb.

7. A system according to claim 5, wherein the illuminating device is included in a unit which is wearable by the user on another part of the user's body.

8. A system according to claim 7, wherein the system is wearable on a user's chest or waist.

9. A system according to claim 1, wherein the illuminating device is incorporated in a unit which also incorporates a radio transceiver operable to receive radio signals from a transmitter associated with the reader device and to forward radio signals to a remote receiver.

10. A system according to claim 1, wherein the detector means includes a reflector on the reader device and means for irradiating a region including the reader means with a search beam of radiation to be reflected by the reflector when incident thereon.

11. A system according to claim 10, wherein the search beam comprises an infra-red beam.

12. A system according to claim 10, wherein the detector means also comprises a sensor operable to detect radiation reflected by the reflector and to record the position of the search beam when reflected by the reflector.

13. A system according to claim 12, wherein one or both of the means for irradiating and the sensor are carried by a unit incorporating the illuminating device.

14. A system according to claim 1, wherein the detector means includes means for determining the location of the reader device by radio signals sent between a transmitter carried on the reader device and a separate receiver.

15. A system according to claim 14, wherein the separate receiver is carried on a unit incorporating the illuminating device.

16. A system according to claim 1, wherein the illuminating device comprises a light source comprising at least one solid state light cell.

17. A system according to claim 16, wherein the at least one light cell comprises a light emitting diode or an electroluminescent cell.

18. A system according to claim 1, wherein the illuminating device includes a light source and is operable such that light from the light source is directed in the form of a beam by a beam director whose orientation may be adjusted.

19. A system according to claim 18 and wherein the beam director comprises a movable mirror, lens, or prism.

20. A system according to claim 19 and wherein the beam director comprises a mirror which may be orientated electromechanically.

21. A system according to claim 18, wherein the detector means includes means for irradiating a region including the reader device with a search beam, and the beam director included in the device for illuminating is also operable to direct the search beam.

22. A method of illuminating and reading information on a target comprising:
    illuminating the target by an illuminating device;
    capturing an optical image of the target when illuminated by the illuminating device by a reader device separate from the illuminating device;
    detecting by detector means the location of the reader device; and
    automatically adjusting, by an adjustment means included in the illuminating device, the illumination provided by the illuminating device in response to a signal provided by the detector means to the adjustment means so that a region on the target illuminated by the illuminating device is readable by the reader device.

23. An apparatus for illumination information on a target to be read by a reader device, the apparatus comprising:
    an illuminating device for illuminating the target;
    detector means for detecting the location of the reader device; and
    adjustment means included in the illuminating device for automatically adjusting the illumination provided by the illuminating device in response to a signal provided by the detector means to the adjustment means so that a region on the target illuminated by the illuminating device is readable by the reader device.

* * * * *

UNITED STATES PATENT AND TRADEMARK OFFICE
CERTIFICATE OF CORRECTION

PATENT NO. : 7,109,460 B2 Page 1 of 1
APPLICATION NO. : 10/737365
DATED : September 19, 2006
INVENTOR(S) : Diamantstein et al.

It is certified that error appears in the above-identified patent and that said Letters Patent is hereby corrected as shown below:

In Claim 10, column 5, line 47, change "means" to --device--

Signed and Sealed this

First Day of May, 2007

JON W. DUDAS
*Director of the United States Patent and Trademark Office*